UNITED STATES PATENT OFFICE.

ARTHUR S. ELSENBAST AND WALTER L. JORDAN, OF NEW YORK, N. Y.

INSULATING CEMENT OR MORTAR.

1,421,192. Specification of Letters Patent. Patented June 27, 1922.

No Drawing. Application filed March 19, 1921. Serial No. 453,740.

*To all whom it may concern:*

Be it known that we, ARTHUR S. ELSENBAST and WALTER L. JORDAN, both citizens of the United States, and residents of the city, county, and State of New York, have invented certain new and useful Improvements in Insulating Cement or Mortar, of which the following is a specification.

Our invention relates in general to compositions employed for cement or mortar, and more particularly to those suitable for use in heat insulating constructions such as walls and coverings.

Heat insulating materials are usually porous and preferably of light weight. In the construction of heat insulating walls, porous bricks or blocks of diatomaceous earth in one form or another are extensively used and will serve as an important example of the kind of installation for which the present invention is designed. These bricks are of very light weight and of extremely high porosity, the air cells being continuous and connected throughout the structure of the brick. When fire clay or ordinary mortars or cements are applied to the surface of such bricks, rapid absorption of the water from the mortar ensues with the result that, the mortar being deprived of much of this ingredient, it becomes difficult or almost impossible to lay the brick in a workmanlike manner. One of the primary objects of our present invention is to provide a mortar or cement which is free from this disadvantage.

Another important consideration in the erection of heat insulating walls is found in the necessity that the joints be as thin as practicable. That is to say, the insulating quality of the cement or mortar is, in most cases, inferior to that of the brick and, for this reason, offers paths of correspondingly better conductivity for the passage of heat through the wall. Our present invention, accordingly, has in view as an additional object the provision of a cement or mortar which is adapted to properly join together or unite the brick work with relatively thin or narrow joints while at the same time aiming to avoid undue heat conductivity of the cementing material itself.

A still further consideration, which frequently pertains to cements or mortars for the purposes described, is that they should possess good adhesive quality. The importance of this is illustrated for example in the case of forming heat insulating coverings or walls on the bottom or around the curved surfaces of metal tanks, boilers, digestors and the like. An additional object of the present invention is to provide a mortar which will give a sufficient temporary adhesion to a metal surface to hold the insulating material in place until permanently tied with wire, metal bands or the like.

The composition, according to the present invention, comprises in its preferred form a major or principal ingredient in the form of powdered, diatomaceous earth, an insoluble plastic such as clay, and an insoluble adhesive substance such as starch. Soluble materials are not employed because being soluble they would be absorbed with the water into the porous brick or other material with which the mortar is in contact. The starch and clay together have the property of making the mass plastic when mixed with water and also provide for the desired adhesiveness and retention of water against absorption into the adjacent porous materials. Accordingly, the proportions of these ingredients may be varied considerably to conform with the particular properties required. When used at high temperatures, at which for example the starch may be destroyed, the clay develops into a permanent bonding material.

We may mention as what may be termed normal or ordinary proportions the following. Finely divided diatomaceous earth 80%; plastic clay 10%; and starch 10%, by weight. These ingredients may be thoroughly mixed and commingled in dry state, and to prepare the mixture for use, it is then made up with sufficient boiling water to give the desired consistency. When thus treated with boiling water, the starch is gelatinized and thus performs the functions described.

Where the mortar or cement is required to have a higher degree of adhesiveness or sticking effect, it is advisable to increase the percentage of clay and starch. On the other hand, if the mortar is to be used for laying brick in a wall and very little sticking effect is necessary, the percentage of clay and starch may be decreased so as to give only the required plasticity and priming effect. The clay employed should be a very plastic one and the clays most desirable are those of the so-called colloidal type.

The composition above described, when made up with boiling water and applied to an insulating brick, will retain its fluidity for several minutes, which is more than ample time for the brick to be rubbed into place and the wall laid with thin joints.

We claim:—

1. An insulating cement comprising powdered diatomaceous earth, clay and starch.

2. An insulating cement comprising a major portion of powdered diatomaceous earth and lesser portions of clay and starch.

3. An insulating cement or mortar comprising, by weight, about 80% of powdered diatomaceous earth, 10% clay, and 10% starch.

4. An insulating cement comprising in the form of a dry powder, diatomaceous earth intermixed with ingredients adapted to become plastic and adhesive upon mixing with boiling water.

ARTHUR S. ELSENBAST.
WALTER L. JORDAN.